United States Patent [19]
Ogushi et al.

[11] Patent Number: 5,259,447
[45] Date of Patent: Nov. 9, 1993

[54] HEAT TRANSPORT SYSTEM

[75] Inventors: Tetsurou Ogushi; Masaaki Murakami; Akira Yao, all of Hyogo, Japan

[73] Assignee: Mitsubishi Denki Kabushiki Kaisha, Tokyo, Japan

[21] Appl. No.: 740,069

[22] Filed: Aug. 5, 1991

[30] Foreign Application Priority Data

Aug. 3, 1990 [JP] Japan ................... 2-207288

[51] Int. Cl.$^5$ ............................................. F28D 15/02
[52] U.S. Cl. ........................ 165/104.22; 165/104.26; 417/207; 417/209
[58] Field of Search ............ 165/104.22, 104.26; 417/207, 208, 209

[56] References Cited
U.S. PATENT DOCUMENTS 4,687,048 8/1987 Edelstein et al. ............ 165/104.26
4,917,173 4/1990 Brown et al. ................ 165/104.26

Primary Examiner—Albert W. Davis, Jr.
Attorney, Agent, or Firm—Wolf, Greenfield & Sacks

[57] ABSTRACT

A heat transport system is disclosed which comprises an evaporator, a condenser, an accumulator, switching means and connecting pipe therethrough. The switching means changes the operation mode from the first mode to the second mode alternatively. In the first mode, cooled liquid flows into the accumulator. In the second mode, the capillary pressure occurring in the evaporator leads the liquid in the accumulator to the evaporator. By switching the first mode and the second mode alternatively, the heat is transported from the evaporator to the condenser. Because of the operation of the capillary pressure, the heat transport system of the present invention can work even in gravity-free environments.

27 Claims, 7 Drawing Sheets

HEAT TRANSPORT SYSTEM

BACKGROUND OF THE INVENTION

The present invention relates to a heat transport system for transporting heat from a heat generating portion to a cooling portion by circulating a working fluid which is changeable in phase. The heat transport system according to the present invention is especially useful in space where there is no gravity.

FIG. 5 and FIG. 6 are, for example, prior heat transport systems disclosed in Japanese Patent Publication No. 29196/1988.

This invention is an improvement of such prior heat transport systems. The construction and operation thereof will be explained hereinafter.

FIG. 5 shows a first operating mode of the prior heat transport system in which an on off valve 11 is closed and a three-way valve 7 is set to place an accumulator 3 in fluid communication with a liquid pipe 13.

Also, FIG. 6 shows a second operating mode of the prior heat transport system in which the on-off valve 11 is opened and the three-way valve 7 is set to place the accumulator 3 in fluid communication with a communicating pipe 4.

In these figures, reference numeral 1 is an evaporator, 2 is a condenser in which working fluid in vapor phase is condensed and liquefied due to heat radiation, 3 is an accumulator, 4 is a communicating pipe which communicates the vapor phase 5 in the evaporator 1 with the vapor phase 6 in the accumulator 3 to balance the inside pressure of the evaporator 1 with that of the accumulator 3. Reference numeral 7 designates a three-way valve having three ports toward the communicating pipe 4, a liquid pipe 13 and the accumulator 3 respectively. Reference numeral 8 designates a liquid returning pipe which communicates the liquid phase 9 in the accumulator 3 with the liquid phase 10 in the evaporator 1. Reference numeral 11 designates an on-off valve positioned in the middle of the liquid returning pipe 8. Reference number 12 designates an vapor pipe which communicates the evaporator 1 with the condenser 2. Reference numeral 13 designates a liquid pipe through which the liquefied working fluid flows from the condenser 2 to the accumulator 3. Reference numeral 14 designates a heat generator such as an electronic apparatus or the like which is mounted on the evaporator 1. Reference numeral 15 designates a radiator which is provided in contact with the condenser 2.

The vapor pipe 12, the liquid pipe 13 and the liquid returning pipe 8 form a closed loop with the evaporator 1, the condenser 2 and the accumulator 3. The condensed working liquid 16 such as freon, alcohol, ammonia or the like flows through the closed loop. The volume of the working liquid 16 may be selected in accordance with the desired operating conditions of the heat transport system and the other factors, as is well-known in the prior art.

The first operating mode shown in FIG. 5 and the second operating mode shown in FIG. 6 are explained hereinafter.

In the first operating mode, the on off valve 11 is closed and the three way valve 7 operates to place the accumulator 3 in communication with the liquid pipe 13. The working liquid 16 in the evaporator 1 is vaporized due to heat generated by a heat generator 14, such as an electronic heating apparatus.

The vapor from the evaporator 1 arrives at the condenser 2 through the vapor pipe 12, as shown by dashed arrow lines in FIG. 5, and is cooled and then liquefied in the condenser 2 due to the extraction of heat from the vapor. The liquefied fluid is pushed out from the condenser 2 by vapor pressure flowing in from the evaporator 1, and flows into the accumulator 3 through the liquid pipe 13, as is shown by solid arrow lines in FIG. 5. The liquid in the evaporator 1 is used for the above-mentioned heat transportation medium.

In the second operating mode as shown in FIG. 6, the on-off valve 11 is opened and the three-way valve 7 is switched to communicate the accumulator 3 with the communicating pipe 4. That is, in this second operating mode, vapor in the evaporator 1 flows into the accumulator 3 through the communicating pipe 4, as shown by a dashed arrow line. And the liquid 9 in the accumulator 3 returns to the evaporator 1 through the liquid returning pipe 8 and the on-off valve 11, as is shown by solid arrow lines in FIG. 6. In the second operating mode, the liquid moves according to the height difference between the liquid 9 in the accumulator 3 and the liquid 10 in the evaporator 1, i.e. on the basis of the gravity in the environment of use.

In these prior transport systems, the first operating mode shown in FIG. 5 and the second operating mode shown in FIG. 6 are alternatively switched at an appropriate time interval using the three-way valve 7 and the on-off valve 11.

As stated above, during the continuous switching between the first operating mode and the second operating mode, the heat generated in the heat generator 14 is transported from the evaporator 1 to the condenser 2 by working liquid 16 which is cooled at the condenser.

However, a disadvantage of the above-mentioned prior heat transport system is that it cannot be used in space where there is little or no gravity, because gravity is relied upon for returning the liquid in the accumulator 3 to the evaporator 1 in the second operating mode as above-mentioned.

SUMMARY OF THE INVENTION

Accordingly, it is an object of the invention to provide an improved heat transport system which is suitable for use even in space or other locations where there is little or no gravity.

In accordance with the present invention there is provided a heat transport system for circulating a working liquid through a looped circuit constructed of an evaporator, a condenser, an accumulator, switching means and pipes connecting these apparatus so as to transport the heat from said evaporator to said condenser, and including capillary means having a heat transfer surface in an evaporator at which the working fluid is changed from a liquid phase to a vapor phase so as to return the liquid from the accumulator to the evaporator.

BRIEF DESCRIPTION OF THE DRAWINGS

The operation and advantages of the present invention will be more fully understood from the detailed description below, which should be read in conjunction with the accompanying drawings in which.

DETAILED DESCRIPTION OF THE PREFERRED EMBODIMENTS

Figure 1:
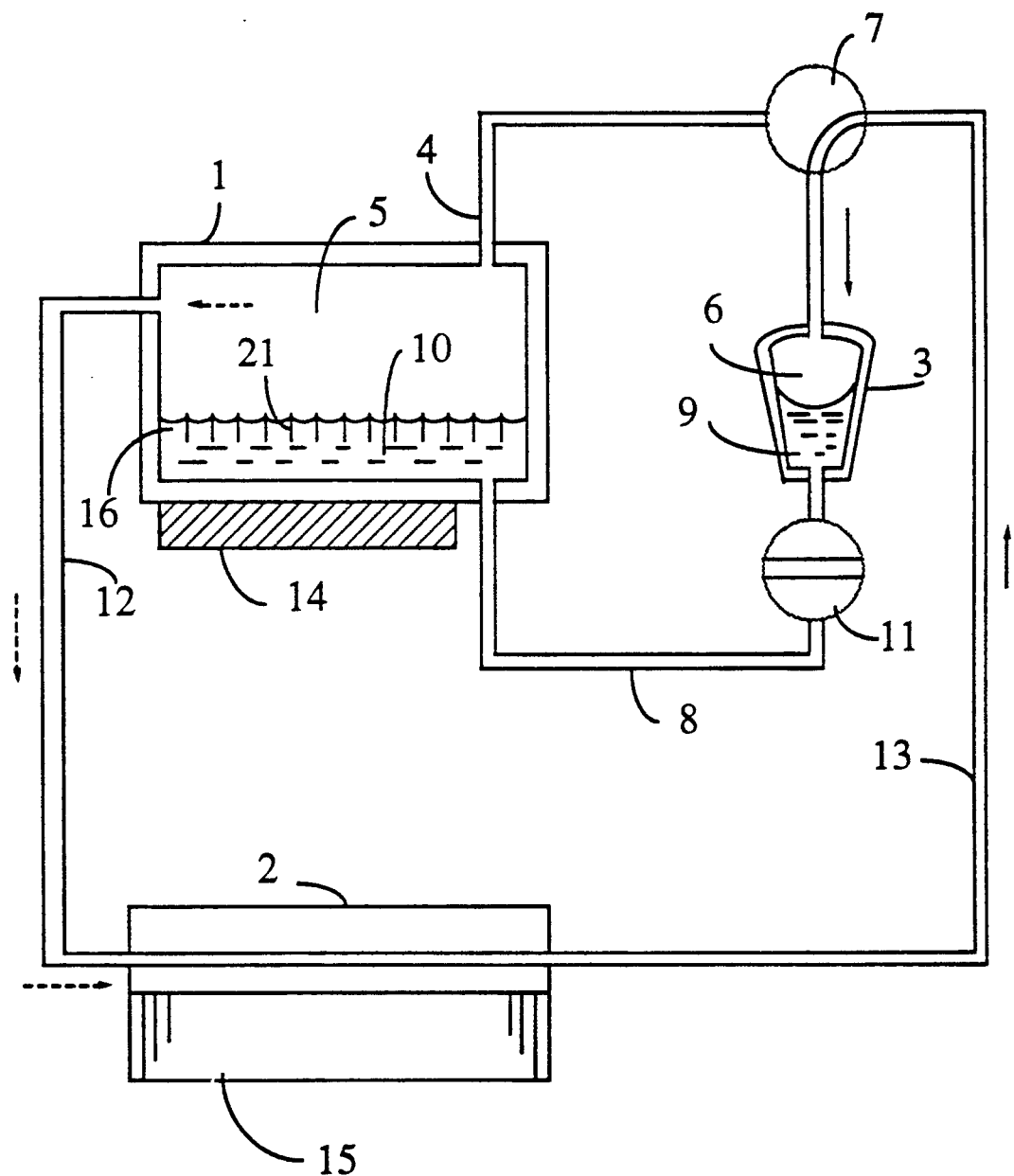
FIG. 1 is a diagrammatic view showing a first operation mode of a heat transport system according to one embodiment of the present invention.
Figure 2:
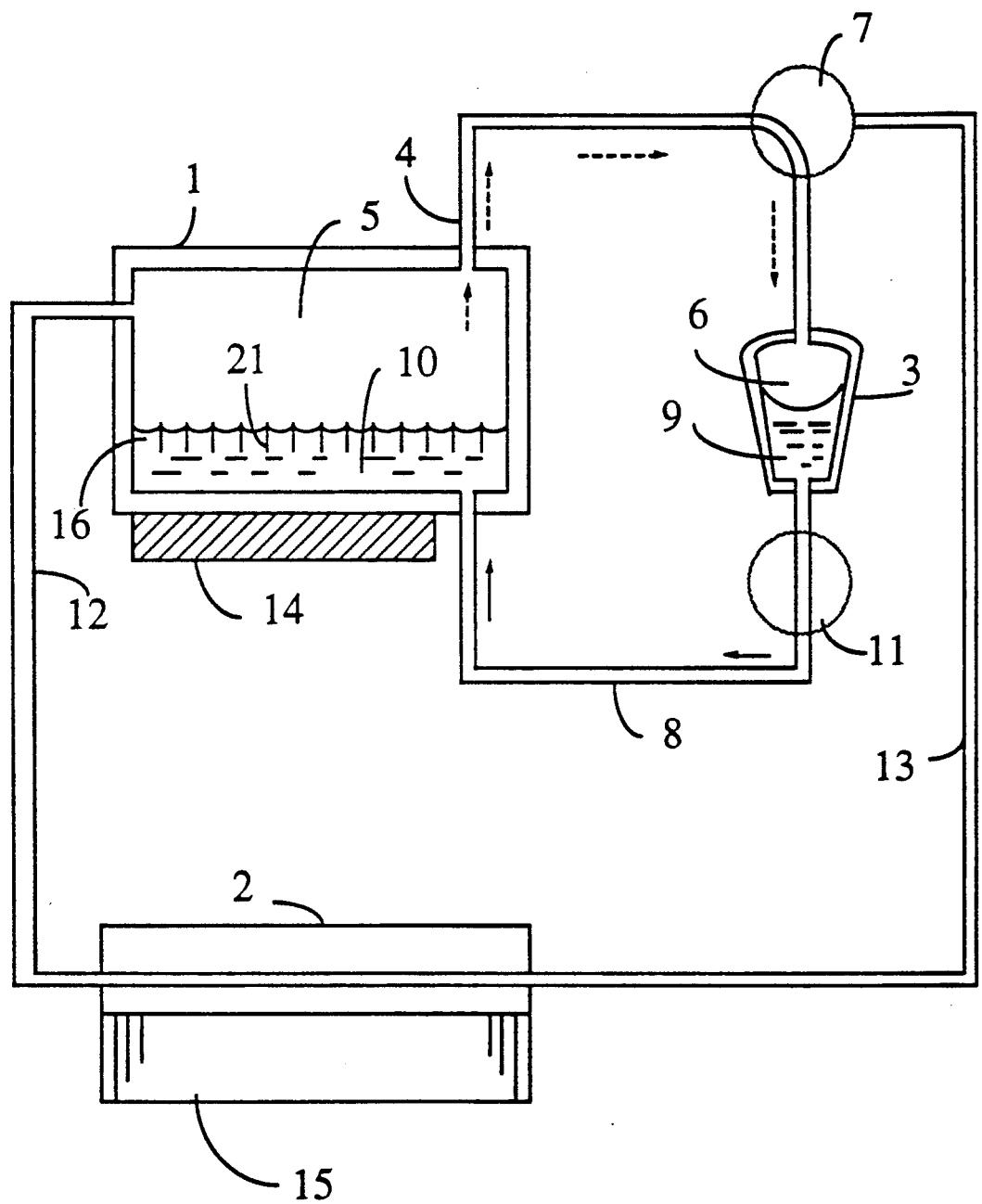
FIG. 2 is a diagrammatic view showing a second operation mode of a heat transport system according to one embodiment of the present invention.

Figs. 1 and 2 are diagrammatic views showing first and second operation modes, respectively, which explain the principle of one embodiment of the heat transport system of the present invention. The elements corresponding to reference numerals 1 and 16 are generally the same as those shown and explained in connection with the prior heat transport system in Figs. 5 and 6. Therefore, no further explanation is needed for these same reference numerals.

Figure 5:
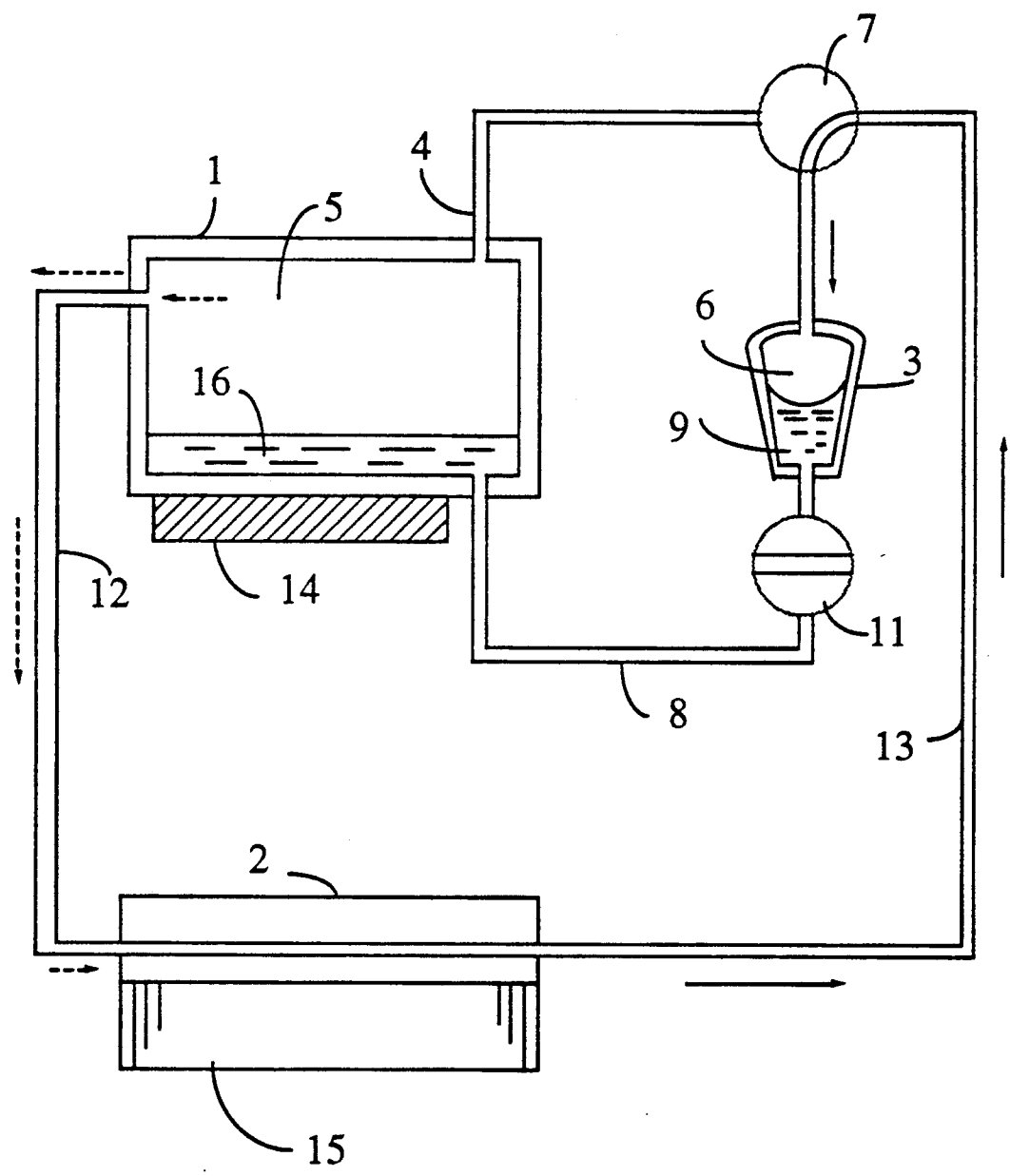
FIG. 5 is a diagrammatic view showing a first operation mode of the prior heat transport system.
Figure 6:
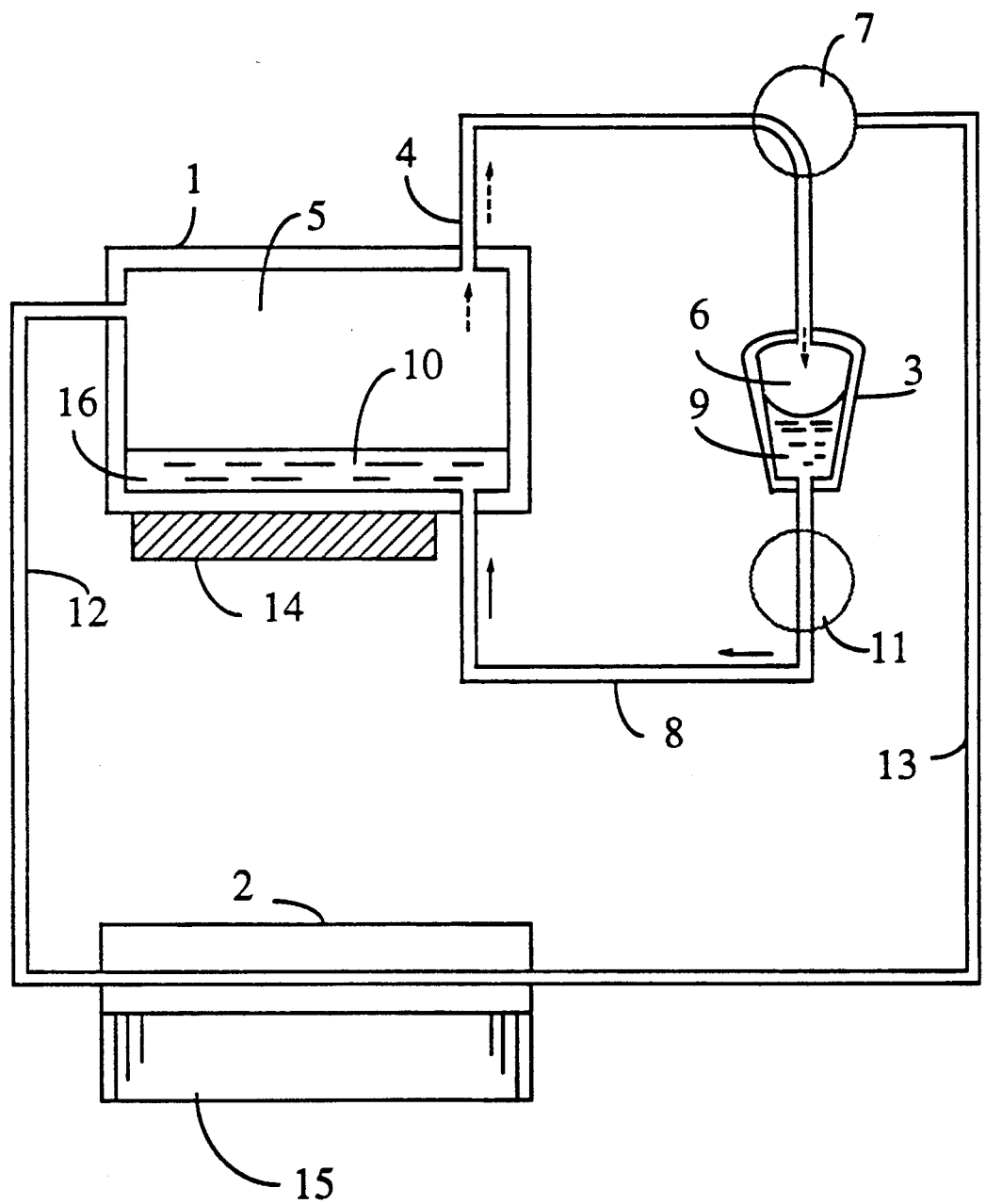
FIG. 6 is a diagrammatic view showing a second operation mode of the prior heat transport system.

In the first operating mode of the present invention shown in FIG. 1, the operation is generally the same as described in connection with FIG. 5.

The on-off valve 11 is closed and the three-way valve 7 operates to place the accumulator 3 in communcation with the liquid pipe 13 as shown in FIG. 1. The working liquid 16 in the evaporator 1 is vaporized due to heat generated by a heat generator 14, such as an electronic apparatus.

The vapor from the evaporator 1 arrives at the condenser 2 through the vapor pipe 12, as shown by dashed arrow lines in FIG. 1, and is cooled and then liquefied in the condenser 2 due to the extraction of heat from the vapor. The liquefied fluid is pushed out from the condenser 2 by vapor pressure flowing from the evaporator 1, and flows into the accumulator 3 through the liquid pipe 13, as is shown by solid arrow lines in FIG. 1.

FIG. 2 is the second operating mode in the present heat transport system in which the on-off valve 11 is opened and the three way valve 7 places the accumulator 3 in communication with the communicating pipe 4. The second operating mode of the heat transport system of the present invention is generally the same as the above-mentioned second operating mode of the prior heat transport system. Therefore, the further explanation of the second operation mode of the present invention is abbreviated.

In FIG. 2, 21 is a capillary means for providing capillary action where the liquid 16 changes into a vapor phase 5 in the evaporator 1.

Figure 7:
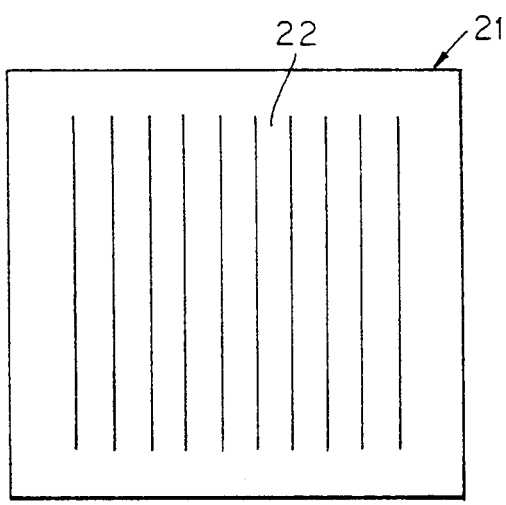
FIG. 7 is a diagrammatic top view of a capillary means according to the present invention.

The capillary means 21 is constructed at a heat transfer surface, for example, by a plurality of slots 22 as shown in FIG. 7. These slots are arranged continuously in parallel and their pitch is about 0.5 mm (millimeters). The capillary means 21 extends along at least a part of the boundary surface of the vapor phase and the liquid phase in the evaporator 1.

The working liquid 9 in the accumulator 3 flows into evaporator 1 through on off valve 11 and the returning pipe 8 as shown by the solid arrow lines, by the capillary pressure generated by the capillary means at the heat transfer surface of the evaporator 1.

As capillarity is not affected in a gravity-free environment, the system of the present invention is suitable for use in a gravity-free environment.

Figure 3:
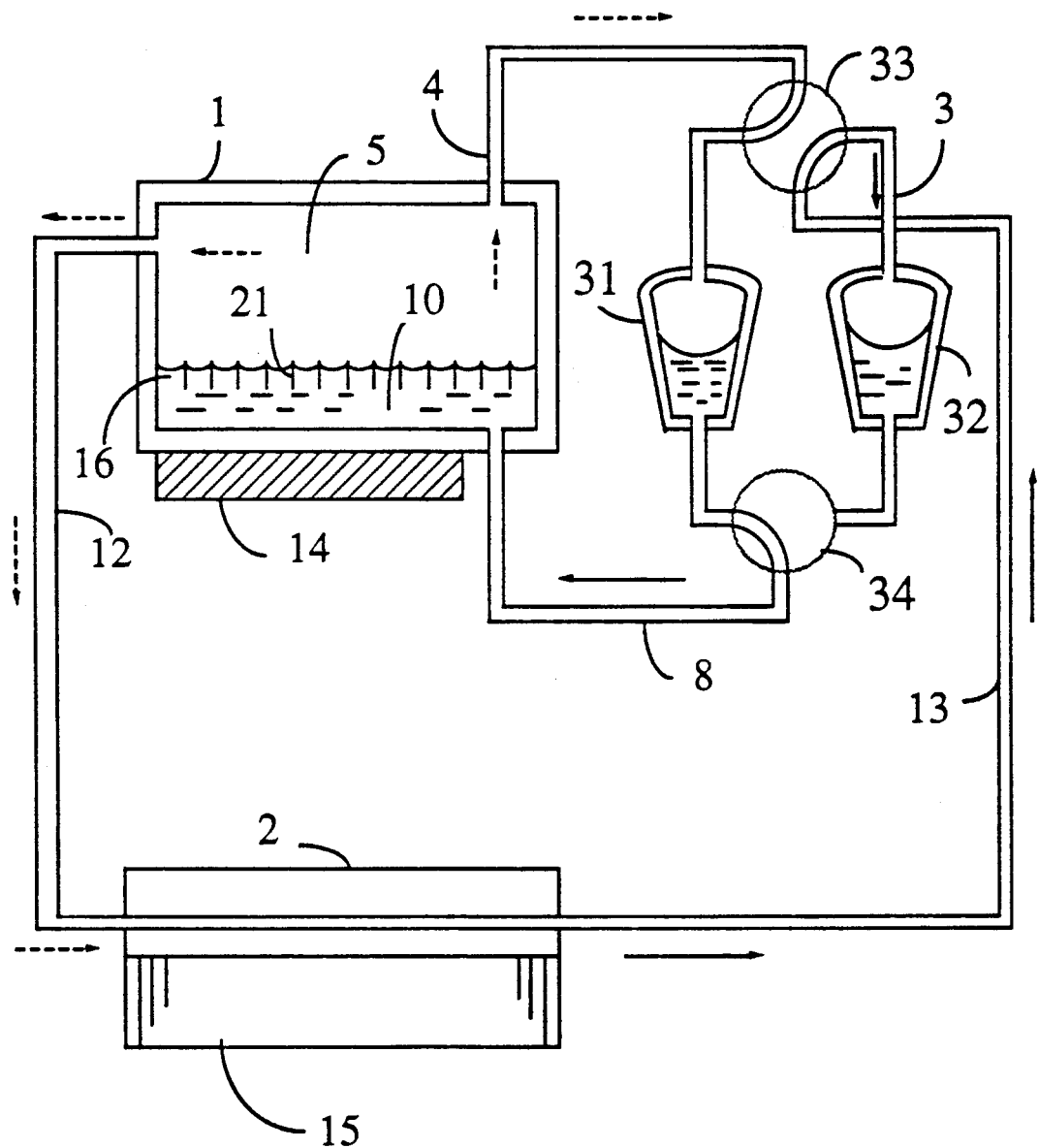
FIG. 3 is a diagrammatic view showing a first operation mode of a heat transport system according to another embodiment of the present invention.
Figure 4:
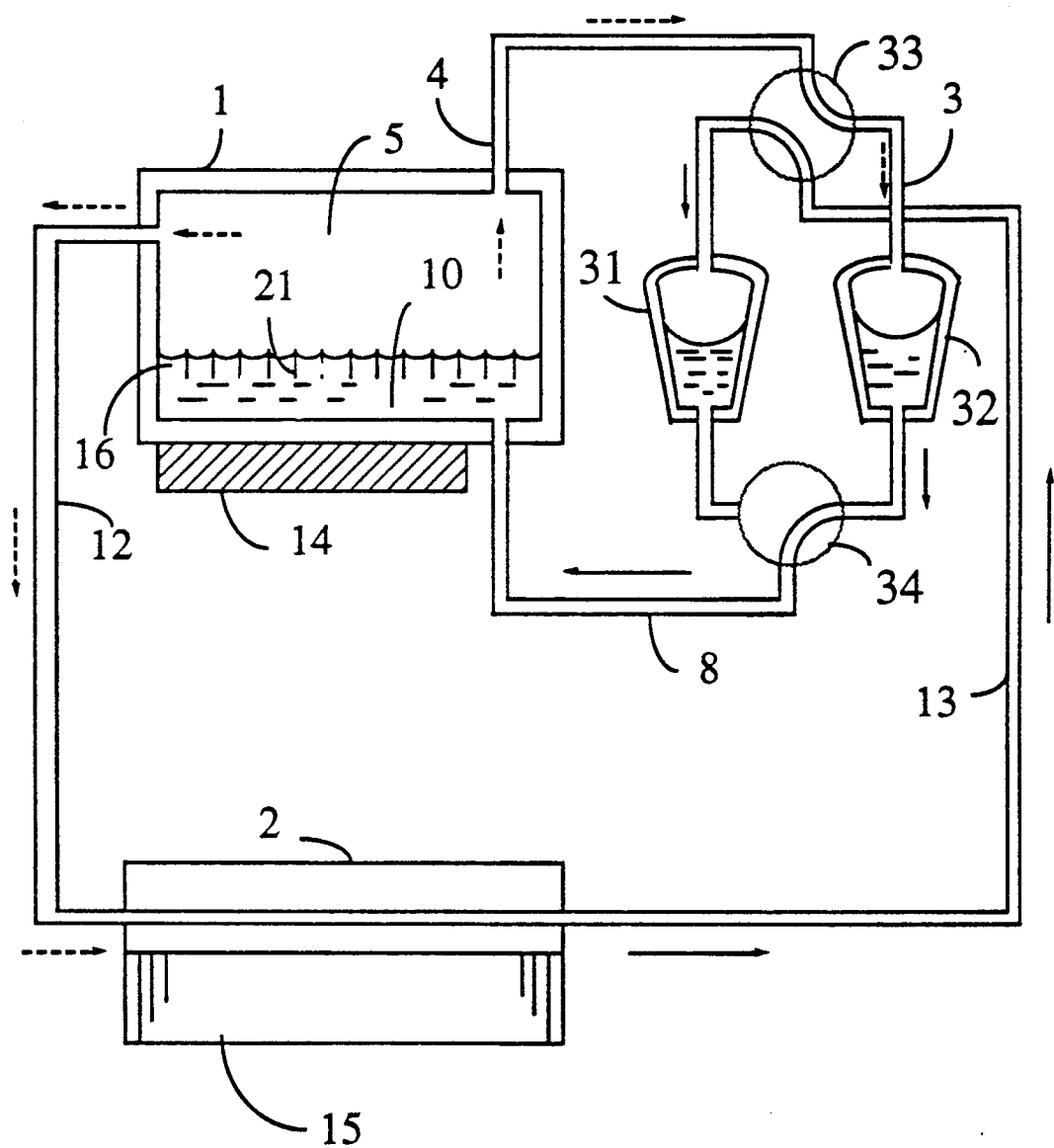
FIG. 4 is a diagrammatic view showing a second operation mode of a heat transport system according to another embodiment of the present invention.

Figs. 3 and 4 show a first and a second operating mode respectively of another embodiment of the present invention wherein a plurality of accumulators are provided.

In FIGS. 3 and 4, reference numerals 31 and 32 designate a first and a second accumulator, respectively. Reference numeral 33 is a four-way valve having four ports toward the accumulators 31 and 32, the communicating pipe 4 and the liquid pipe 13, respectively. Reference numeral 34 is a three-way valve having three ports toward the accumulators 31 and 32, and liquid returning pipe 8, respectively.

In the first operating mode in FIG. 3, the valves 33 and 34 are switched so that the vapor phase in the first accumulator 31 is placed with the communicating pipe 4. and the liquid phase in the first accumulator 31 is communicated with the liquid returning pipe 8, and the vapor phase in the second accumulator 32 is communicated with the liquid pipe 13.

In this first operating mode, vapor generated in the evaporator 1 travels through the vapor pipe 12 to the condenser 2 in which the vapor is cooled and condensed. As a result, heat is transported from the evaporator 1 to the condenser 2. The condensed working liquid from the condenser 2 travels to the second accumulator 32 through the liquid pipe 13 and the four-way valve 33.

During the first operating mode, liquid existing in the first accumulator 31 flows back into the evaporator 1 through the three-way valve 34 and liquid returning pipe 8 under the effect of capillary pressure of the capillary means 21.

In the second operating mode shown in FIG. 4, the valves 33 and 34 are changed so that the vapor phase in the second accumulator 32 is communicated with the communicating pipe 4, and liquid phase in the second accumulator 32 is communicated with the liquid returning pipe 8, and the vapor phase in the first accumulator 31 is communicated with the liquid pipe 13. In the second operating mode, the working fluid in the condenser 2 flows into the first accumulator 31, and the liquid in the second accumulator 32 flows back into the evaporator 1.

These first and second operating modes are alternatively switched at an appropriate time interval.

In the embodiments shown in Figs. 1 to 4, the on-off valve 11, the three way valves 7 and 34 and four-way valve 33 may be controlled so that each of the valves is switched at a predetermined time period, respectively. Alternatively, such switching may be controlled in response to the detection of liquid level change in the evaporator 1 or the accumulators 3, 31, 32.

Though the heat transport systems in the above description include one or two accumulators, more than two accumulators may be provided.

Capillary materials 25 may also be used in the accumulators 3, 31, 32, although not described above. When capillary materials are used in the accumulators, the pitch of the capillary slots should be chosen to be greater than that of the capillary slots in the evaporator 1 so that the liquid in the accumulator may easily return back to the accumulator 1.

Further, in the above embodiments, slots are used for providing capillary action at the heat transfer surface; however, any materials which have capillarity, such as foamed metal, felt metal, mesh metal and stranded wires, may be used.

What is claimed is:

1. A heat transport system for circulating a working liquid fluid through a looped circuit constructed of an evaporator having a reservoir of working liquid, a condenser, an accumulator, switching means and connecting pipes so as to transport heat from said evaporator to said condenser, wherein the improvement comprises:

in the reservoir of the evaporator, capillary means having a heat transfer surface at which the working fluid is changed from a liquid phase to a vapor phase so as to return the liquid from the accumulator to the evaporator and wherein the heat transport system further comprises a second capillary means provided in the accumulator.

2. A heat transport system for circulating a working liquid through a looped circuit constructed of an evaporator having a reservoir of working liquid, a condenser, a plurality of accumulators, switching means and connecting pipes so as to transport heat from said evaporator to said condenser, wherein the improvement comprises:

in the reservoir of the evaporator, capillary means having a heat transfer surface at which the working fluid is changed from a liquid phase to a vapor phase so as to return the liquid from the accumulators to the evaporator and wherein the heat transport system further comprises a second capillary means provided in the accumulators.

3. The heat transport system of claim 1 wherein said capillary means comprises means defining a plurality of slots in the heat transfer surface.

4. The heat transport system of claim 2 wherein said capillary means comprises means defining a plurality of slots in the heat transfer surface.

5. The heat transport system of claim 3 wherein said slots are arranged substantially in parallel and have a pitch of about 0.5 mm.

6. The heat transport system of claim 4 wherein said slots are arranged substantially in parallel and have a pitch of about 0.5 mm.

7. The heat transport system of claim 1 wherein said capillary means is constructed of a perforated member.

8. The heat transport system of claim 7 wherein said perforated member is constructed of foam-like metal.

9. The heat transport system of claim 7 wherein said perforated member is constructed of felt-like metal.

10. The heat transport system of claim 7 wherein said perforated member is constructed of mesh-like metal.

11. The heat transport system of claim 7 wherein said perforated member is constructed of stranded wires.

12. A heat transfer system for circulating a working liquid, comprising:

an evaporator for vaporizing the working liquid having a reservoir of working liquid;
a condenser for condensing the working fluid in the vapor phase;
means providing fluid communication from the evaporator to the condenser;
an accumulator;
switching means for alternatively providing fluid communication from the condenser to the accumulator or between the evaporator and the accumulator;
capillary means, disposed in the reservoir of the evaporator, and having a heat transfer surface at which the working fluid is changed from a liquid phase to a vapor phase; and
a second capillary means disposed in the accumulator.

13. A heat transfer system as set forth in claim 12, wherein said capillary means comprises means defining a plurality of slots in the heat transfer surface.

14. A heat transfer system as set forth in claim 13, wherein said slots are arranged substantially in parallel and have a pitch of about 0.5 mm.

15. A heat transfer system as set forth in claim 12, wherein said capillary means comprises a member having means defining at least one perforation.

16. A heat transfer system as set forth in claim 15, wherein said member is constructed of foam-like metal.

17. A heat transfer system as set forth in claim 15, wherein said member is constructed of felt-like metal.

18. A heat transfer system as set forth in claim 15, wherein said member is constructed of mesh-like metal.

19. A heat transfer system as set forth in claim 15, wherein said member is constructed of stranded wires.

20. A heat transport system for circulating a working liquid comprising:

an evaporator for changing the working liquid into a vapor phase, said evaporator having a reservoir of working liquid;
a condenser, fluidly connected to said evaporator, for condensing the vapor back into the working liquid;
an accumulator for accumulating the condensed working liquid, said accumulator having first and second ends;
means for alternately connecting said first end of said accumulator to either said condenser or said evaporator;
means for connecting said second end of said accumulator to said evaporator;
capillary means, disposed in the reservoir of working liquid within said evaporator, for changing working liquid within said evaporator into a vapor phase, thereby creating capillary pressure to return the accumulated working liquid from said accumulator to said evaporator; and
a second capillary means provided in the accumulator.

21. The heat transport system of claim 20 wherein said capillary means comprises means defining a plurality of slots in the heat transfer surface.

22. The heat transport system of claim 20 wherein said slots are arranged substantially in parallel and have a pitch of about 0.5 mm.

23. The heat transport system of claim 20 wherein said capillary means is constructed of a perforated member.

24. The heat transport system of claim 20 wherein said perforated member is constructed of foam-like metal.

25. The heat transport system of claim 20 wherein said perforated member is constructed of felt-like metal.

26. The heat transport system of claim 20 wherein said perforated member is constructed of mesh-like metal.

27. The heat transport system of claim 20 wherein said perforated member is constructed of stranded wires.

* * * * *